Nov. 20, 1962
A. R. MISHKIN ET AL
3,065,077
METHOD OF MAKING A SOLUBLE TEA PRODUCT
Filed Feb. 2, 1960
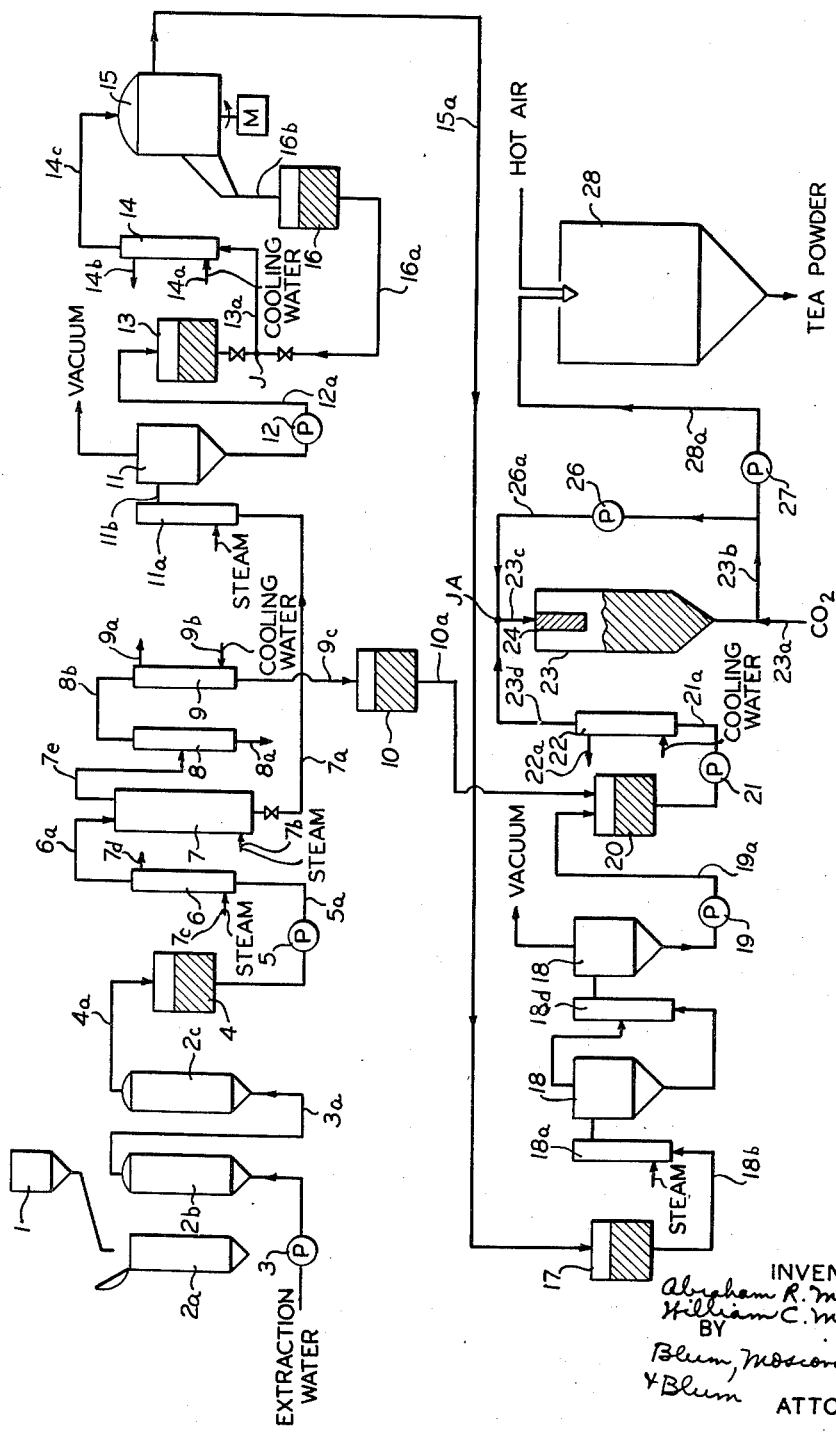
INVENTORS
Abraham R. Mishkin &
William C. Marsh
BY
Blum, Moscovitz, Friedman
& Blum
ATTORNEYS.

United States Patent Office 3,065,077
Patented Nov. 20, 1962

3,065,077
METHOD OF MAKING A SOLUBLE TEA PRODUCT
Abraham R. Mishkin and William C. Marsh, Marysville, Ohio, assignors to Afico, S.A., Lausanne, Switzerland, a corporation of Switzerland
Filed Feb. 2, 1960, Ser. No. 6,282
9 Claims. (Cl. 99—77)

Our invention relates to a new and improved powdered, cold-water-soluble tea extract and a new and improved process for making said extract. The new process is optionally continuous. The new extract is quickly and completely soluble in water at 13° C. and this solution remains stable, without any substantial precipitation, when said solution is cooled to as low as 4° C., so that the new extract can be readily used for making iced tea whose temperature is 4° C. and even below.

When we refer herein to cold water, we refer to water at substantially 13° C.

Numerous objects and advantages of our invention will be apparent and are set forth in the following description and in the annexed flow sheet.

It has been proposed in Herz U.S. Patent No. 2,831,772, patented April 22, 1958, to make a dry powdered tea extract which readily dissolves in water. According to the pertinent examples of this Herz patent, an initial hot, aqueous tea extract is cooled to 20° C., thus precipitating certain cold-water-insoluble tea solids, which consist chiefly of tannins. The precipitated cold-water-insoluble tea solids are separated from the cooled, initial tea extract, and said separated, precipitated cold-water-insoluble tea solids are then solubilized to be soluble in water at 20° C., by boiling said tea solids with an aqueous solution of sodium sulfite or equivalent solubilizing agent which is specified in said Herz patent.

These solubilizing agents are conveniently designated as systemically innocuous sulfites. They include water-soluble sulfites and bisulfites and sulfurous acid. According to said Herz patent, said solution of the precipitated tea solids is added to the aqueous residue of the initial tea extract, and the mixture is spray-dried.

This prior Herz process, however, does not give entire satisfaction in the taste of the beverage obtained by aqueous solution of the final dry extract or product, and in the speed at which said final dry product or powdered extract dissolves in cold water. Further, this prior Herz process requires the use of relatively expensive tea blends.

These disadvantages of the Herz process are overcome by the process disclosed herein.

Without limitation thereto, the best and most complete embodiment or example of our invention includes the following steps in sequence, using countercurrent extraction in each extraction stage of this example. In this example, two extraction cells or percolators are used in series in each extraction stage. The hot extracting water is initially admitted into and is flowed through the first percolator in each respective extraction stage. Said first percolator contains a charge of wet, partially extracted or partially exhausted tea leaves at the beginning of each respective extraction stage. These wet, partially exhausted tea leaves were partially extracted in the next-preceding extraction stage.

In said next-preceding extraction stage, the first percolator was in the position of the second percolator. At the beginning of each respective extraction stage, the second percolator has a charge of dry, unextracted or unexhausted tea leaves. In this example, the weight of the charge of dry, unexhausted tea leaves in the second percolator is one kilogram at the beginning of each extraction stage. In this example, the weight of the wet, partially exhausted tea leaves in the first percolator at the beginning of each extraction stage is one kilogram, less the weight of the tea solids which were extracted from the one kilogram of dry, unexhausted tea leaves during the next-preceding extraction stage, plus the weight of the extracting water which remained absorbed in the charge of tea leaves in the second percolator during the next-preceding extraction stage.

That is, when a percolator occupies the second position at the beginning of each respective extraction stage, said second percolator has been previously filled with the same selected weight of dry, unexhausted tea leaves, such as one kilogram. In each countercurrent extraction stage, a relatively weak, aqueous tea extract is formed by completing the extraction of the wet, partially exhausted tea leaves in the first percolator by flowing hot water through said first percolator, and this relatively weak aqueous tea extract which flows out of the first percolator is flowed through the charge of dry, unexhausted tea leaves in the second percolator. The initial aqueous tea extract flows out of the second percolator.

We have discovered certain important factors which are required in order to make a superior powdered tea extract.

(A) In each countercurrent extraction stage, the weight of the extracting water is substantially twelve times to substantially sixteen times the weight of the charge of dry, unexhausted tea leaves in the second percolator, at the beginning of said extraction stage.

The weight of the initial aqueous tea extract may be fourteen times the weight of said charge. The weight of the extracted tea solids in the initial aqueous tea extract which flows out of the second percolator may be substantially 2.6 percent of the weight of said aqueous tea extract. The aqueous tea extract contains volatile tea aromatics, in addition to the extracted tea solids. Thus, if the weight of each charge of dry, unexhausted tea leaves is one kilogram at the beginning of each extraction stage, the weight of the initial aqueous tea extract which flows out of the second percolator in said extraction stage may be 14 kilograms, and said initial, aqueous tea extract may contain 364 grams of dissolved tea solids which have been extracted during the respective extraction stage from the charge of wet, partially exhausted tea leaves in the first percolator and from the kilogram of dry, unextracted tea leaves in the second percolator.

As above noted, the term "tea solids" does not include the volatile tea aromatics. The hot extracting water enters the first percolator at substantially 95° C.–105° C. (203° F.–221° F.) and the relatively weak aqueous tea extract flows out of said first percolator to enter the second percolator at substantially 90° C., and the aqueous, initial tea extract flows out of the second percolator at substantially 90° C.

The total period during which the extracting water flows through all the series-connected percolators during each extraction stage is substantially 25–40 minutes.

(B) In the next step, the initial aqueous tea extract which flows out of the second percolator in step (A) is stripped of at least a part of its volatile tea aromatics. Preferably, a major part by weight of said tea aromatics is thus removed. All or substantially all of said tea aromatics may be removed. For convenience, the residue of the initial aqueous tea extract which remains as a result of said stripping step, is designated as the dearomatized residue of the initial aqueous tea extract, even though said de-aromatized residue may contain some unstripped tea aromatics.

The tea aromatics may be vaporized and stripped from the vertically downwardly flowing initial aqueous tea extract by a current of steam which is flowed vertically upwardly in order to vaporize and remove the vaporized tea aromatics, mixed with steam. The temperature of the stripping steam may be substantially 100° C. The stripped and vaporized tea aromatics may be separated substantially wholly from the stripping steam, and the separated vaporized tea aromatics are condensed. If desired, the mixture of vaporized tea aromatics and stripping steam may be condensed together to form a single liquid condensate.

(C) The dearomatized aqueous extract of step (B) may contain 2.6 percent by weight of dissolved tea solids, at 20° C.–30° C. This dearomatized aqueous tea extract is concentrated, using any standard vacuum evaporator which is used to concentrate heat-sensitive materials. Said dearomatized aqueous extract may be concentrated to substantially 30 percent of its original volume. This concentrate of the dearomatized aqueous extract may have substantially 8 percent by weight of dissolved tea solids. When this concentrate is cooled to below 11° C., but close to 11° C., such as 8° C.–10° C., a fraction of substantially 28% to 34% by weight of the dissolved tea solids will be precipitated.

As above noted, the solids which are precipitated by cooling consist chiefly of tannins. By cooling the concentrate to an even lower temperature, more tea solids will be precipitated, but according to our process, we prefer to cool moderately, to a minimum temperature of 8° C., in order to prevent precipitating the tea solids which remain soluble in the tea extract or in water at 8° C.

As above noted, the dearomatized tea extract may have (by weight) substantially 2.6 percent of tea solids at 20° C., prior to chilling. As a result of the chilling to substantially 8° C.–10° C., the weight of the precipitated tea solids may be 22.4 grams to 31.2 grams per kilo of the concentrate of the dearomatized aqueous tea extract, and the residual, chilled, dearomatized concentrate may contain 57.6 grams to 58.8 grams of non-precipitated tea solids per kilo.

The precipitated tea solids are separated from the clarified or non-precipitated residue of the dearomatized, aqueous concentrate which is mentioned in this step (C). As above noted, this clarified, non-precipitated residue may contain 57.6 grams to 58.8 grams of non-precipitated tea solids per kilo.

A major ratio by weight of the tea solids remains unprecipitated.

(D) the precipitated separated, tea solids which are mentioned in step (C) may be in flowable and stirrable form, due to the admixture of some of the liquid, non-precipitated part of the dearomatized concentrate which is mentioned in step (C). Only a part of these precipitated, separated tea solids are solubilized to be soluble in cold water. This solubilization of said part may be done as disclosed in said Herz U.S. Patent No. 2,831,772. The preferred solubilizing agent is an aqueous solution of sodium sulfite. This aqueous solubilizing solution is mixed with all the precipitated, separated tea solids and the mixture is heated. The amount of sodium sulfite is selected so that a maximum of 90% by weight of said precipitated, separated tea solids is made cold-water-soluble. The pH of the mixture may be adjusted to a value of 5, by adding an aqueous acidifying solution of acetic acid in water.

The solubilized part of said precipitated, separated tea solids is conveniently designated as the solubilized fraction. The non-solubilized fraction of said precipitated, separated tea solids is discarded.

(E) A mixture is made of the separated, acidified, solubilized fraction which is mentioned in step (D) with the clarified, non-precipitated residue of the dearomatized, aqueous concentrate which is mentioned in step (C) and also with the condensate of the stripped tea aromatics which is mentioned in step (B). This condensate of the stripped tea aromatics may be substantially free from water, or it may be mixed with the condensate of some or all of the stripping steam.

(F) The aqueous mixture which is mentioned in step (E) is carbonated at substantially 7° C.–18° C. (substantially 45° F.–65° F.). The pressure of the carbon dioxide is substantially the absolute pressure of 6–20 atmospheres (substantially 90–300 pounds per square inch). The carbon dioxide is dissolved in said aqueous mixture without forming any foam. The carbonated aqueous mixture is conveniently designated as the spray liquid. This spray liquid is dried, as by spray-drying, to make a substantially dry, powdered cold-water-soluble tea extract, whose bulk density may be substantially 0.06 gram to 0.14 gram per milliliter.

In this example, there is countercurrent extraction in each stage, two percolators or extraction cells being used in series in each countercurrent extraction stage. These percolators may be substantially cylindrical, with tapered inlets. A third percolator of said type is emptied and refilled with dry, unexhausted tea leaves, while the other two percolators are being used in a respective extraction stage.

In the specific stage shown in the drawing, the percolator 2b is the first percolator and the percolator 2c is the second percolator, and percolator 2a is out of use and has been emptied of the wet, wholly exhausted tea leaves and is being refilled with the selected charge of dry, wholly unexhausted tea leaves from bin 1. These three percolators 2a, 2b, 2c are identical.

In the respective countercurrent extraction stage illustrated in the drawing, the second percolator 2c has a charge of dry, wholly unexhausted tea leaves, said charge having a weight of one kilogram, as one example.

Said percolator 2c was out of use in the next-preceding countercurrent extraction stage. In the respective extraction stage illustrated in the drawing, the first percolator 2b contains a charge of wet, partially exhausted tea leaves. Said first percolator 2b was the second percolator in the next-preceding countercurrent extraction stage. When each percolator has been used in two successive countercurrent extraction stages, first as a second percolator and then as a first percolator, said percolator is put into the position of percolator 2a which is shown in the drawing, to be emptied and receive a fresh charge of dry, unexhausted tea leaves from bin 1. These charges from bin 1 are of equal weight, such as one kilogram, as one example.

Since countercurrent extraction is well known per se, it is sufficient to state that more than two extraction cells or percolators can be used in series in each counter-current extraction stage and that the last percolator contains unexhausted tea leaves and that the exhaustion of the tea leaves increases from the last cell to the first cell of the series, and that the first cell, which contains the most exhausted tea leaves, is removed from the series to be emptied and refilled with dry, unexhausted tea leaves and to serve as the last percolator in the next countercurrent extraction stage.

Each reference letter "P" indicates a pump. The pump 3 pumps hot water into the bottom of the first percolator 2b. The water flows vertically upwardly through the charge of wet, partially exhausted tea leaves which substantially fill the first percolator 2b. The hot water may enter the bottom of percolator 2b at a temperature of substantially 95° C. The weak tea extract which is formed in the first percolator 2b flows out of the top of said first percolator 2b at a temperature of substantially 95° C. The weak tea extract flows through pipe 3a to the bottom of second percolator 2c at substantially 95° C. The weak tea extract flows vertically upwardly through the charge of dry, unexhausted tea leaves in the second percolator 2c. As above noted, the weight of said charge of dry, unexhausted tea leaves in the second percolator is one kilogram in this example.

The initial aqueous tea extract flows out of the top of second percolator 2c at a temperature of substantially 95° C., to flow through pipe 4a into storage tank 4. As above noted, said initial aqueous tea extract which flows into tank 4 may have a weight of 14 kilos in each extraction stage, and may contain 2.6 percent by weight of tea solids. In addition to said tea solids, said initial aqueous tea extract has volatile tea aromatics. A pool of said initial aqueous tea extract is accumulated in storage tank 4, and after said pool has been accumulated, said extract can be withdrawn continuously at a constant rate from said pool by pump 5 through pipe 5a, while the pool is kept replenished in batches from the second percolator in successive extraction stages, so as to keep the weight of said pool substantially constant. The weight of said pool in storage tank 4 may be 20 kilos in this example.

This accumulated pool makes it possible to continuously feed the initial, aqueous tea extract at constant speed of flow through preheater 6 to the stripping column 7. Also, said pool is replenished by successive batches of initial, aqueous tea extract and these batches are mixed in said pool, so that an initial, aqueous tea extract of substantially constant composition is fed to preheater 6. Since tea leaves are a natural product, the composition of the respective batches of initial, aqueous tea extract may vary somewhat in composition.

The pipe 5a is connected to the bottom of pre-heater 6, through which the initial, aqueous tea extract flows vertically upwardly. The initial, aqueous tea extract may enter the bottom of pre-heater 6 at a constant rate of flow at substantially 90° C., and flow at said constant rate out of the top of preheater 6, through pipe 6a, at substantially 100° C. The pre-heater 6 is of the usual cylindrical vertical type, which has the usual heating jacket (not shown), through which steam or other heating agent is flowed continuously at a constant rate. This jacket has the usual inlet pipe 7c (marked "Steam") for the steam or other heating agent, and the usual outlet 7d for the heating agent.

The pipe 6a is connected to the top of the vertical stripping column 7, which is of the well-known type. The pre-heated, initial aqueous tea extract flows downwardly through stripping column 7. Stripping steam is supplied at a temperature of substantially 100° C. to the stripping column 7, adjacent its bottom end, through the side inlet 7b, which is marked "Steam."

At least a part or even all of the volatile tea aromatics are vaporized in the stripping column 7 by the vertically upward flowing current of stripping steam. The mixture of vaporized tea aromatics and steam flows continuously at a constant rate out of the top of stripping column 7 through pipe 7e, at a temperature of substantially 100° C. The de-aromatized, aqueous initial tea extract flows continuously and at a constant rate out of the bottom of stripping column 7 through the valved pipe 7a to the pre-heater 11a of the vacuum concentrator 11.

The drawing shows a rectifying column 8, whose use is optional. The outlet pipe 7e of stripping column 7 is connected to a suitably located inlet of rectifying column 8. This rectifying column 8 is of the usual type, and it is used to separate all or a substantial part of the steam from the mixture of steam and vaporized tea aromatics which flows out of the top of the vertical stripping column 7. The steam which is in the mixture of vaporized tea aromatics and steam which flows continuously at a constant rate into the vertical rectifying column 8, is condensed in said rectifying column 8, and the condensed steam is discharged through drain pipe 8a from the bottom of rectifying column 8. The vaporized tea aromatics, which may be substantially free from steam, flow continuously and at a constant rate and at substantially 100° C. from the top of rectifying column 8, through pipe 8b to the top of the vertical condenser 9. This condenser 9 is of the usual type. It has the usual annular, vertical cooling jacket, through which cold water or other coolant is flowed continuously at a constant rate. This jacket has an inlet 9b, marked "cooling water" for the coolant. This cooling jacket has an outlet 9a. The condensed tea aromatics are discharged from the bottom of the vertical condenser 9 through pipe 9c into tank 10. The condensed tea aromatics are conveniently designated as the "distillate" and the tank 10 is conveniently designated as the "distillate tank."

If the optional rectifying column 8 is omitted, the outlet pipe 7e of the stripping column 7 is connected to the top of condenser 9. In such case the tank 10 is supplied with a mixture of the condenser tea aromatics and the condensed stripping steam. A pool of condensate is maintained in tank 10, so that condensate can be withdrawn continuously and at a constant rate from tank 10 through valved pipe 10a, into mixing tank 20. In this example, the weight of the pool of condensate which is maintained in tank 10 may be substantially 20 kilos.

As previously noted, the dearomatized, aqueous tea extract is fed continuously and at a constant rate through pipe 7a, to the bottom inlet of the vertical preheater 11a of the vacuum concentrator 11. This vacuum concentrator 11 is of any suitable type for concentrating heat-sensitive materials. The drawing shows a one-stage vacuum evaporator, but this vacuum evaporator may have a plurality of stages. The chamber of the vacuum concentrator 11 is connected to an evacuating pump (not shown) through a pipe marked "Vacuum."

The pre-heater 11a has the usual heating jacket through which steam or other heating agent is flowed continuously at a constant rate. The drawing shows only the inlet of said heating jacket, marked "Steam." This preheater 11a is connected to vacuum concentrator 11 through pipe 11b.

The de-aromatized, aqueous tea extract may enter pre-heater 11a at substantially 90° C., and flow out of pre-heater 11a through pipe 11b to enter vacuum evaporator 11 at substantially 100° C.

The de-aromatized aqueous tea extract which flows into vacuum evaporator 11 may have 2.6 percent by weight of dissolved tea solids. The concentrated, de-aromatized, aqueous tea extract is pumped by pump 12 through 12a to storage tank 13. The volume of the concentrate which flows out of vacuum evaporator 11 may be 30 percent of the volume of the de-aromatized, aqueous tea extract which flows into vacuum evaporator 11, so that the concentrate which flows into storage tank 13 may have about 8 percent by weight of dissolved tea solids.

A pool of concentrate of sufficient volume may be maintained in storage tank 13 so that concentrate can be flowed continuously and at constant rate into said pool, and concentrate may be flowed continuously and at said constant rate out of said pool, through pipe 13a into the bottom of vertical cooler 14. This pipe 13a is valved, the valve being conventionally represented. All the pipes used in the apparatus may have hand-operated valves. Said pipe 13a is connected at junction J to a valved pipe 16a, for a purpose later described.

The cooler 14 is of conventional type. It is provided with the usual cooling jacket, through which cooling water or other coolant is continuously circulated at a constant rate. This jacket has an inlet 14a (marked "Cooling Water") and an outlet 14b.

The concentrate enters cooler 14 through pipe 13a at about 95° C., and said concentrate flows vertically upwardly through cooler 14 to be cooled to a temperature in said cooler to below 11° C., but close to 11° C., as 8° C.–10° C. The selected fraction of the tea solids in the concentrate is thus precipitated in cooler 14, to flow in unison with the non-precipitated part of the concentrate. This non-precipitated part includes the dissolved, non-precipitated tea solids.

The cooled, concentrated extract flows continuously and at a uniform rate out of the top of cooler 14 through pipe 14c to the separator 15, in which the precipitated tea solids are separated from the liquid, non-precipitated part of the cooled concentrate. In this example, the separator 15 is a centrifuge. Other separating means may be used, such as filtering or decanting, but centrifuging is preferred.

The separated, precipitated tea solids are flowed continuously and at constant rate out of centrifuge 15, through pipe 16b into solubilizing tank 16. These separated tea solids are mixed with some of the liquid, non-precipitated part of the concentrate which flows into centrifuge 15, so that said separated tea solids are an easily flowable mass, which can be easily mixed in tank 16 with the aqueous soltuion of the solubilizing agent. The non-precipitated part of the concentrate which enters centrifuge 15, is flowed continuously and at a constant rate out of centrifuge 15 through pipe 15a into tank 17.

The selected tea solids may be precipitated by using tannic acid, prior to using the cooling step in cooler 14. In such case, the effluent from vacuum concentrator 11 is heated to substantially 95° C., and tannic acid is continuously mixed with said flowing effluent in a constant ratio by weight. Thus, the tannic acid may be supplied to an inlet of pump 12 or to an inlet of pipe 12a. The ratio of the added tannic acid is preferably substantially 3% to 8% by weight of the tea solids in the effluent of the concentrator 11. Since the effluent from concentrate 11 may contain substantially 80 grams of tea solids per kilogram, the weight of the added tannic acid precipitant may be substantially 2.4 grams to 6.4 grams per kilogram of said effluent. After the tannic acid is mixed with said effluent, the mixture is flowed through cooler 14 in which said mixture is cooled as previously mentioned and is then fed to the centrifuge 15, where the precipitated tea solids are separated as above described.

The separated, precipitated fraction is accumulated in solubilizing tank 16 to provide a pool whose weight may be 9 kilos. This separated fraction consists mainly of tannins and caffeine. Only a part of the tea solids in the pool in tank 16 is cold-water-solubilized by reacting said pool with an aqueous solution of a solubilizing agent. This solubilizing agent may be an aqueous solution of sodium sulfite or other solubilizing agent which is mentioned in said Herz U.S. Patent No. 2,831,772. The mixture in solubilizing tank 16 may be heated for the purpose of the solubilizing reaction. The amount of solubilizing agent which is added to said pool in solubilizing tank 16 is less than the amount which is required to cold-water-solubilize all of the tea solids in said pool.

The partially solubilized pool in solubilizing tank 16 is flowed through valved pipe 16a to junction J and then through pipe 13a to and through cooler 14 to be cooled to 8° C.–10° C. and then through centrifuge 15, while the valve which controls the connection between tank 13 and pipe 13a is temporarily closed. For convenience, the passage of the contents of tank 13 through pipe 13a, cooler 14 and centrifuge 15 is designated as the first run or main run, and the passage of the partially solubilized pool in solubilizing tank 16 through pipe 16a, cooler 14 and centrifuge 15 is designated as the second run. The first run or main run is therefore interrupted during the second run.

During the second run, the entire partially solubilized contents of solubilizing tank 16 are cooled in cooler 14 as previously described, thus precipitating the non-solubilized fraction of said partially solubilized contents in cooler 14. The cold-water-solubilized fraction of said partially solubilized contents is discharged in the second run from centrifuge 15 through pipe 15a to tank 17, to be mixed with the non-precipitated liquid which has flowed from centrifuge 15 into tank 17 during the first run. The non-solubilized fraction of said partially solubilized contents of tank 16 is discharged from centrifuge 15 through pipe 16b in the second run, to be discarded as waste.

If desired, a separate cooler and centrifuge may be used for the main run and the second run.

The mixed, clarified or non-precipitated liquids in tank 17 which result from the first and second runs are concentrated in a conventional vacuum evaporator or concentrator 18 of any well-known type which is used for concentrating heat-sensitive materials or liquids. A two-stage evaporator 18 is illustrated. The drawing shows a vertical pre-heater 18a, whose bottom end is connected to tank 17, through valved pipe 18b, and whose outlet end is connected to the first stage of two-stage vacuum concentrator 18, whose second stage is connected by a pipe marked "Vacuum" to an evacuating pump.

The pre-heater 18a is of the usual type which has an outer heating jacket, through which a current of steam or other heating agent is flowed continuously and at a constant rate. The drawing shows the inlet of said jacket for the heating agent, marked "Steam." The outlet of said heating jacket is not shown. The mixture from tank 17 flows vertically upwardly through pre-heater 18a. The inlet temperature of said mixture in pre-heater 18a may be 15° C., and its outlet temperature, at which it enters vacuum concentrator 18, may be 90° C. There is a second pre-heater 18d between the first and second stages of the vacuum concentrator 18.

The pump 19 pumps the concentrate from the second stage of vacuum concentrator 18 into the mixing tank 20 to which the aromatic condensate from the stripping column 7 or from the rectifying column 8 is flowed, depending upon whether the rectifying column 8 is omitted or used.

The mixture which is formed in mixing tank 20 thus includes the tea aromatics and the cold-water-solubilized tea solids and excludes the cold-water-insoluble tea solids.

The pump 21 pumps the mixture from tank 20 through pipe 21a, to the bottom of the vertical cooler 22, which has the usual jacket through which cold water or other coolant is flowed continuously at a constant rate. The inlet of this jacket is marked "Cooling Water." Said jacket has an outlet 22a. The mixture from tank 20 is flowed vertically upwardly through cooler 22. The inlet temperature of the mixture may be 60° C. The outlet temperature of the mixture from cooler 22 is substantially 12° C.–17° C. (substantially 53° F.–63° F.). There is no precipitation of tea solids in the cooled mixture within cooler 22, because all the tea solids in said mixture remain dissolved in the water of said mixture, even at 11° C. and a little below 11° C. The cooled mixture flows vertically upwardly out of cooler 22 through pipe 23d, to junction JA and then vertically downwardly through pipe 23c to the top of vertical carbonator 23. A short length of ring packing 24, of the usual type, is located at the top of carbonator 23 at the inlet of inlet tube 23c, in order to increase the surface of the liquid mixture which contacts with the carbon dioxide. Gaseous carbon dioxide is forced into the bottom end of the vertical carbonator 23, through a gas inlet pipe 23a, which is marked "$CO_2$."

The carbonation pressure of the carbon dioxide within carbonator 23 may be an absolute pressure of 15–20 atmospheres, preferably 18 atmospheres. The carbonation temperature within carbonator 23 is substantially 12° C.–17° C. The pump 21 exerts enough pressure to maintain said carbonation pressure within carbonator 23. During the carbonation step, a part of the carbonated mixture flows out of the bottom end of carbonator 23 through pipe 23b and through pump 26 and pipe 26a to junction JA and back to carbonator 23 through pipe 23c. The rate of recirculation of the carbonated liquid by pump 26 through carbonator 23 may vary within wide limits. The rate of flow through recirculating pump 26 may be one-third to three times the rate of flow through inlet pump 21 and cooler 22.

The fully carbonated mixture is forced through pump 27 and pipe 28a into the spray-drier 28, which may be of the well-known type. The carbonated mixture is atomized or sprayed into the spray-drier 28. The usual pipe, marked "Hot Air," supplies heated air in order to atomize the mixture and to supply the heat for evaporating the water from the fine drops of the mixture. The powdered extract is discharged by gravity from the bottom of spray-drier 28, through an outlet marked "Tea Powder."

The atomizing pressure which is exerted by pump 27 is preferably higher than the carbonating pressure within carbonator 23, in order to avoid foam formation in the inlet pipe 28a of the spray-drier 28.

Thus, the atomizing pressure which is exerted by pump 27 may be an absolute pressure of substantially 50–250 atmospheres (substantially 750–3700 pounds per square inch).

Without limitation thereto, our invention is illustrated in the following examples. All proportions stated in said examples are by weight. Countercurrent extraction was used in each example, with two percolators connected in series in each extraction stage. The weight of the charge of dry, unexhausted tea leaves in the second percolator, at the beginning of each extraction stage, was in the same, such as a charge of one kilogram. Since tea is a natural product and the composition of tea depends upon its source and upon the treatment of the tea leaves, some variations from the examples herein must be allowed. The treatment and composition of various teas are well-known, and are set forth, for example, in pages 706–720 of volume VI (published in 1926) of Thorpe's "Dictionary of Applied Chemistry."

As stated therein, tea may be treated to be either green tea or black tea, and the most important ingredients of tea are caffeine (theine), tannins, and the essential oil or tea aromatic.

*Example 1*

The charge of dry, unexhausted tea leaves in the second percolator at the beginning of each respective extraction stage, had a weight which is designated by the symbol "K." The value of K may be one kilogram. Each charge of dry, unexhausted tea leaves consisted of 57% of Ceylon tea and 43% of Java tea.

The total period of flow of the extracting liquid through both of the two series-connected percolators was fifteen minutes in each extraction stage. The hot water entered the first percolator at substantially 100° C. The weak tea extract flowed out of the first percolator to enter the second percolator at substantially 95° C. The initial, aqueous tea extract flowed out of the second percolator at substantially 95° C.

The initial, aqueous tea extract which flowed out of the second percolator in each extraction stage had 2.3% of dissolved tea solids, plus tea aromatics. In this example, the weight of the initial, aqueous tea extract which flowed out of the second percolator was 14K. Hence, assuming that the value of K was one kilogram, the fourteen kilos of initial, aqueous tea extract which flowed out of the second percolator had a total of 322 grams of dissolved tea solids which had been extracted from the kilo of dry, unexhausted tea leaves in the second percolator and from the charge of partly exhausted, wet tea leaves in the first percolator, during the respective extraction stage.

This initial aqueous tea extract was flowed through pre-heater 6 to be heated to 99° C.

The pre-heated initial aqueous tea extract entered the top of stripping column 7 at 99° C. to flow vertically downwardly in said stripping column 7. The current of stripping steam which was flowed vertically upwardly through stripping column 7 entered said stripping column 7 at a temperature of substantiall 100° C. The weight of the stripping steam which was used in stripping column 7 to strip each batch of the initial, aqueous tea extract was 1.50K, corresponding to 1500 grams of steam if the value of "K" was one kilogram. In this example, the rectifying column 8 was omitted, so that the vapor of the stripped fraction or distillate of the tea aromatics, mixed with steam, flowed out of the top of stripping column 7 through pipe 7e directly to the top of condenser 9 and the mixture of condensed tea aromatics and condensed steam flowed into tank 10 and finally into mixing tank 20.

The weight of the condensate was 0.349K, corresponding to 349 grams of condensate which flowed into tank 10 during each extraction stage, if the value of K was one kilogram.

Of course, the greater part of this condensate which flowed into tank 10 consisted of condensed steam, since the rectifying column 8 was not used.

The de-aromatized, residual tea extract which flowed out of stripping column 7 through pipe 7a was concentrated in the vacuum concentrator 11, without recirculation in the concentration step, under a reduced pressure of 12.5–7.4 centimeters of mercury, and at a corresponding reduced temperature of substantially 95° C., until the concentrate which flowed out of vacuum concentrator 11 had 8% of dissolved tea solids. Since the de-aromatized residue which flowed through pipe 7a into vacuum concentrator 11 had 2.3% of dissolved tea solids, the volume of the de-aromatized concentrate which flowed out of vacuum concentrator 11 was substantially three-tenths of the volume of the de-aromatized residue which flowed into vacuum concentrator 11.

The de-aromatized concentrate which flowed out of vacuum concentrator 11 was chilled to 10° C. by passing said concentrate through cooler 14. This cooler 14 may be the well-known plate type of cooler. A fraction of 32.5% of the total tea solids in said concentrate was thus precipitated by the chilling in cooler 14. Since the concentrate which flowed into cooler 14 had eight grams of tea solids per kilo of concentrate, twenty-six grams of tea solids per kilo of said chilled concentrate were precipitated in cooler 14, and 54 grams of tea solids per kilo remained unprecipitated. Only a minor ratio by weight of the tea solids was precipitated. These precipitated tea solids, amounting to 26 grams per kilo of chilled concentrate, were separated during the first run as a flowable mass from the non-precipitated part of said chilled concentrate in centrifuge 15 and said precipitated, separated solids were flowed through pipe 16b to solubilizing tank 16 during the first run, and the non-precipitated part of said chilled concentrate, having 54 grams per kilo of non-precipitated tea solids, was flowed through pipe 15a to tank 17 during the first run.

A mass of substantially 9 kilos (about 20 pounds) of said precipitated, separated fraction was accumulated in solubilizing tank 16 during the first run. This mass which had 2.34 kilos of tea solids was mixed at 20° C.–30° C. with an aqueous solution of 635 grams (about 1.4 pounds) of sodium sulfite, dissolved in substantially 28 kilos of water, so that the mixture in tank 16 had substantially 8% by weight of tea solids.

In order to cold-water solubilize all the tea solids in said entire mass of about 9 kilos, substantially 750 grams of sodium sulfite would be required. This mixture was heated in tank 16 at 100° C. for three hours, with the optional use of a reflux condenser to prevent evaporation of water from said mixture during this partial solubilizing step. Immediately after said heating period of three hours, the pH of the mixture was adjusted to a value of 5, by adding an acidifying aqueous solution of acetic acid, which contained 50 percent of acetic acid.

The partly solubilized mixture in solubilizing tank 16 may be cooled promptly to 20° C.–30° C. after the partial solubilization has been completed and be acidified in said temperature range of 20° C.–30° C. to a pH value of 5. This pH value of 5 is measured by the glass electrode at 20° C.–30° C.

The non-precipitated liquid which flowed out of centrifuge 15 through pipe 15a in the first run or main run, to be collected in tank 17, had 67.5% of the tea solids in the chilled concentrate which flowed into centrifuge 15 through pipe 15c during the first run.

Since the concentrate which entered centrifuge 15 in the first run had eighty grams of tea solids per kilo, the non-precipitated liquid which was accumulated in tank 17 during the first or main run had 54 grams of tea solids per kilo. This first-run non-precipitated liquid collected in tank 17 was concentrated to a solids content of 537 grams of tea solids per kilo in the two-stage vacuum concentrator 18, namely, to about one-tenth of its original volume. The concentration temperature in the first stage of vacuum concentrator 18 was 85° C., corresponding to a pressure of 460 millimeters of mercury.

The entire mixture in solubilizing tank 16, in which only part of the tannins had been cold-water solubilized, was passed through cooler 14 and centrifuge 15 in a second run, independently of the first run. The cooler 14 again chilled the flowing material to 10° C.

The cold-water-solubilized part of the tea solids was separated from the non-cold-water-solubilized part in centrifuge 15 in the second run, and said cold-water solubilized part which had 5.3% by weight of tea solids, was flowed through pipe 15a into tank 17 during the second run. The unsolubilized part of the tea solids in tank 16 was flowed out of centrifuge 15 during the second run, to be discarded. The cold-water-solubilized part was concentrated in the two-stage evaporator 18 at the above-mentioned respective pressures and temperatures, to a solids content of 53.7% by weight, corresponding to substantially one-tenth of the volume which entered evaporator 18. This concentrate of the solubilized tea solids which flowed out of evaporator 18 was mixed in tank 20 with the aromatic condensate from condenser 9 and also with the concentrate of the first-run clarified or non-precipitated liquid which had flowed through pipe 15a in the first run, and which had been concentrated in evaporator 18.

This mixture in tank 20 had substantially 4.15 parts by weight of tea solids secured from the first run liquid which had flowed through pipe 15a in the first run, to one part of tea solids secured from the second run liquid which flowed through pipe 15a in the second run separation. Substantially 50% by weight of the tea solids accumulated in tank 16 where cold-water-solubilized in tank 16 and were added to tank 17 in the second run, and the other 50% was discarded.

This final mixture in tank 20, which is conveniently designated as the spray liquor, had 33.3% by weight of tea ingredients, which included tea solids and volatile tea aromatics. The total weight of all tea ingredients in said final mixture was 22% of the weight of the charge of dry, unexhausted tea leaves in the second percolator, so that if K was one kilogram, this spray liquor had a total of 220 grams of tea ingredients consisting of tea solids and volatile tea aromatics, extracted partly from the kilo of dry, unexhausted tea leaves in the second percolator and partly from the partially exhausted tea leaves in the first percolator.

This spray liquor was cooled in cooler 22 to 10° C. (50° F.) and was carbonated at that temperature with carbon dioxide at an average absolute pressure of 17.7 atmospheres, or about 260 pounds per square inch. The cooling of the spray liquor to 10° C. did not cause any precipitate therein.

This carbonated spray liquor was fed at 10° C. to a standard spray drier of the well-known Merrell-Soule type, to make an excellent dry, powdered tea extract having a bulk density of 0.085 gram per milliliter. The moisture content of this powder was 3.34% by weight. This powdered tea was freely and completely soluble in water at 13° C. (55° F.). In order to make a beverage corresponding to a household tea, 0.3 gram of this powder were dissolved in 100 cubic centimeters of water at 13° C. The solution remained clear when it was chilled to 4° C.

*Example 2*

The charge of dry tea leaves in each extraction consisted of 15% of green tea, 15% of Formosa tea, 20% of Java tea and 50% of Ceylon tea.

Countercurrent extraction was used, as described in Example No. 1.

In this example, the rectification column 8 was used, so that the distillate which flowed from condenser 9 into tank 10 and finally into mixing tank 20, had a minimum amount of water. The initial, aqueous tea extract which flowed out of the second percolator to enter preheater 6 had 2.3% by weight of tea solids.

As in Example 1, substantially 14 kilos of initial, aqueous tea extract flowed out of the second percolator during each extraction stage, with about twenty-three grams of tea solids per kilo of said initial, aqueous tea extract. The total weight of the extracted tea solids during each extraction stage was about 32.2% of the weight of the charge of dry, unextracted tea leaves which was in the second percolator at the beginning of the respective extraction stage.

Of course, as in Example 1, part of the extracted tea solids and of the tea aromatics were secured from the partially exhausted charge of tea leaves in the first percolator.

This initial, aqueous tea extract was pre-heated to 99° C. in preheater 6 and was flowed at said temperature into the top of stripping column 7. The stripping steam entered the bottom part of stripping column 7 at 100° C. The weight of the stripping steam used in each extraction stage was 175% of the weight of the dry, unexhausted tea leaves which were in the second percolator at the beginning of the respective extraction stage, so that if this weight "K" was one kilo, the weight of the stripping steam was 1,750 grams during the respective extraction stage. The weight of the distillate of tea aromatic which flowed out of rectifying column 8 through condenser 9 into tank 10 and finally to mixing tank 20 was 30.2% K or 302 grams if "K" was one kilo.

The de-aromatized, residual first run extract which flowed through pipe 7a was concentrated in vacuum concentration 11 as in Example 1, from 2.3% by weight of tea solids to 8% by weight of tea solids, namely, to about three-tenths of its volume which entered vacuum concentrator 11.

The de-aromatized, residual, first-run extract which flowed out of vacuum concentrator 11 with 8% by weight of tea solids was cooled in cooler 14 to 10° C. and was centrifuged in centrifuge 15 as in Example 1. The precipitated, separated solids which flowed out of centrifuge 15 through pipe 16b into solubilizing tank 16 during the first run, amounted to 29.9% by weight of the tea solids in said 8% extract. Hence, the tea solids in the liquid which flowed into solubilizing tank 16 during the first run had 23.92 grams of precipitated tea solids per kilo of said liquid.

Substantially 9 kilos of this first run, separated fraction was accumulated in solubilizing tank 16 during the first run, containing substantially 215 grams of cold-water-insoluble tea solids.

Said 9 kilos were mixed in the solubilizing tank 16 with an aqueous solution of 820 grams (about 1.8 pounds) of sodium sulfite in about 26 kilos of water, thus providing an aqueous mixture which had a solids content of tea solids of a little more than 8% by weight. This mixture was heated in solubilizing tank 16 at 100° C. (212° F.) for three hours, with the optional use of a reflux condenser to prevent or minimize evaporation of water. The pH of the mixture was then adjusted to a value of 5 by adding an acidifying solution of acetic acid in water. This solution contained 50 percent by weight of acetic acid. Additional water was added if required, so that the mixture contained 8 percent of tea solids by weight.

This mixture was flowed through from tank 16 through the cooler 14 and the centrifuge 15 in the second run. In the second run this mixture was cooled in cooler 14 to 10° C. (about 50° F.).

The clarified or non-precipitated extract which flowed out of centrifuge 15 through pipe 15a to tank 17 in the first run, had 70.1 percent by weight of the cold-water-soluble tea solids from the cooled extract which flowed out of cooler 14 into the centrifuge 15 during the first run. Hence this first-run non-precipitated extract had 5.608% by weight of cold-water soluble tea solids.

The mixture which formed in tank 17 as a result of the first run and the second run, had 2.69 parts by weight of cold-water-soluble tea solids derived from the first run, per one part of cold-water-soluble tea solids derived from the second run. This corresponded to a cold-water-solubilization ratio of 87.3 percent by weight of the tea solids which flowed into tank 16 during the first run.

The mixture in the tank 17 was concentrated in the vacuum concentrator 18 so that the concentrate which flowed out of vacuum concentrator 18 to tank 20 had 59.6 percent by weight of water-soluble tea solids. The distillate or aromatic fraction was mixed in tank 20 with the concentrate from vacuum concentrator 18, as previously described. The resulting spray liquor mixture thus obtained in tank 20 had 36 percent by weight of water-soluble tea solids and tea aromatics.

The spray liquor mixture in tank 20 was cooled to 16° C. (about 60° F.) and carbonated in carbonator 23 at an absolute pressure of 17.7 atmospheres (about 260 pounds per square inch).

The spray-drier 28 was of the type described in U.S. Patent No. 2,353,459. This spray-drying resulted in an excellent powder which had a bulk density of 0.09 gram per milliliter, a moisture content of 2.50 percent by weight, and easy and complete solubility in cold water at 11° C. (52° F.).

*Example 3*

In this example, the blend of the dry tea leaves consisted by weight of 60 percent of Ceylon tea and 40 percent of Java tea. Countercurrent extraction was used as in the previous examples, using two cells or percolators in series in each countercurrent extraction stage. The inlet temperature of the extraction water which flowed upwardly through the first percolator was 104° C. (220° F.), and the exit temperature of said water from the first percolator was 100° C. The tea extract which flowed out of the first percolator entered the bottom of the second percolator at a temperature of 100° C., and flowed out of said second percolator to the preheater 6 at 95° C. The weight of the tea extract which flowed out of the second percolator in each extraction stage was 14 times the weight of the charge of dry, unexhausted tea leaves in the second percolator at the beginning of the respective extraction stage.

It can be conveniently assumed that the weight of the charge of dry, unexhausted tea leaves in the second percolator is one kilo at the beginning of each extraction stage, so that 14 kilos of initial tea extract flow out of the second percolator into the preheater 6 at each extraction stage. The total period of flow of liquid through both extraction cells or percolators in each extraction stage was 15 minutes. The initial, aqueous tea extract which flowed out of the second percolator during each extraction stage had an average content of tea solids of 2.43 percent by weight; so that if the weight of the charge of dry, unexhausted tea leaves was one kilo during each extraction stage, the 14 kilos of the initial, aqueous tea extract contained 340.2 grams of tea solids.

This initial tea extract was preheated to 110° C. (230° F.) in preheater 6, and the heated extract was stripped of its volatile tea aromatics in stripping column 7, using an upwardly flowing current of steam whose weight was 165 percent of the weight of the charge of dry, unexhausted tea leaves in the second percolator.

Hence, in this example, the upwardly flowing current of stripping steam in the stripping column 7 had a weight of 1.65 kilos in each extraction stage. The upwardly flowing current of steam entered the bottom of stripping column 7 at a temperature of 100° C., and the mixture of vaporized tea aromatics and steam flowed out of the top of the stripping column 7 through the pipe 7e into the rectifying column 8 at a temperature of 100° C.

In this example, the rectifying column 8 was used. As a result of this rectification, the rectified distillate or aromatic fraction which flowed through the pipe 9c into the tank 10, was substantially free from condensed water. The weight of the distillate or aromatic fraction which entered the tank 10 from the condenser 9 was 30 percent of the weight of the charge of dry, unexhausted tea leaves in the second percolator at the beginning of the extraction stage. Hence, in this example, 300 grams of distillate flowed into column 10 in each stage. Substantially all of the tea aromatics was stripped.

The residual of dearomatized aqueous tea extract which flowed out of stripping column 7 through pipe 7a during the extraction stage, was heated in preheater 11a and concentrated in the vacuum concentrator 11, without recirculation during concentration, to a solids content of tea solids of 8 percent by weight. In this example, the concentration in concentrator 11 was effected under a vacuum of 67.3 centimeters to 70 centimeters of mercury (about 26.5 to 27.5 inches of mercury) and at a temperature of 54° C.–66° C. (130° F.–150° F.). Since the de-aromatized extract which flowed into evaporator 11 had 2.43% by weight of tea solids, the concentrate which flowed out of vacuum concentrator 11 had substantially 30% of the volume of said de-aromatized extract which flowed through pipe 7a.

The concentrated de-aromatized extract which flowed through pipe 12a into tank 13 was chilled in cooler 14 to a temperature of 8° C.–9° C. (about 46° F.–48° F.), and said cooled, de-aromatized extract was flowed through pipe 14a at 8° C.–9° C. into centrifuge 15 in the first run. In this example, the centrifuge 15 was of the familiar de-sludging type.

In the first run, the non-precipitated fraction which flowed through pipe 15a to tank 17 had 32 percent by weight of the tea solids of the chilled, de-aromatized concentrated extract which flowed into the centrifuge 15 during the first run. Since this inflowing extract had 8 percent by weight of tea solids, the non-precipitated fraction which flowed out of pipe 15a into tank 17 during the first run had 2.56 percent by weight of cold-water-soluble tea solids.

The cold-water-insoluble fraction which was precipitated in cooler 14 during the first run was flowed continuously during said first run from centrifuge 15 through pipe 16b into solubilizing tank 16. The precipitated fraction which was collected in solubilizing tank 16 during the first run was mixed with an aqueous solution of sodium sulfite. The weight of the sodium sulfite was 5.6 percent of the cold-water-insoluble tea solids in the precipitated fraction in tank 16. This sodium sulfite was dissolved in water to form a solution of 30 percent by weight of sodium sulfite. The mixture which was thus formed in solubilizing tank 16 was heated at 100° C. (212° F.) for three hours, with the optional use of a reflux condenser. At the end of this heating period of three hours, the pH of the mixture was adjusted to a value of 5 with an aqueous solution of acetic acid which contained 50 percent by weight of acetic acid.

If necessary, the solids content of the heated and acidified mixture was adjusted to a content of 8 percent by weight of tea solids, by adding water. The partially solubilized mixture thus obtained in solubilizing tank 16, was flowed through the cooler 14 in the second run where said partially solubilized mixture was cooled in cooler 14 to 8° C.–9° C. (46° F.–48° F.) and the cooled mixture was flowed through pipe 14a and centrifuge 15 in said second run. In said second run, the non-precipitated fraction was flowed through pipe 15a into tank 17, and the precipitated fraction was discarded as waste.

The clarified or non-precipitated extract which was flowed into tank 17 through pipe 15a in the first run, had 68 percent by weight of the tea solids of the extract which flowed through cooler 14 into centrifuge 15 during the second run. Hence this first-run non-precipitated extract had 5.28% by weight of cold-water-soluble tea solids.

The mixture which was formed in tank 17 as a result of the first and second runs, had an average ratio by weight of 3.12 parts of tea solids derived from the first run, to one part of water-solubilized tea solids derived from the second run. This corresponded to a solubilization degree of 68 percent by weight, of the tea solids which were collected in solubilizing tank 16 during the first run.

The mixture in tank 17 which resulted from the first run and the second run, was concentrated to a solids content of water-soluble tea solids of 60 percent by weight in the two-stage vacuum concentrator 18. The first pass or stage of the vacuum concentrator 18 was operated at a temperature of 82° C.–88° C. (180° F.–190° F.) and under a vacuum of 43.0–51.0 centimeters of mercury.

The second pass or stage of the vacuum concentrator 18 was operated at substantially 60° C. (140° F.) and under a vacuum of 63.5–68.6 centimeters of mercury (25–27 inches of mercury). The concentrate which flowed out of the second stage of evaporator 18 through the pipe 19a, was mixed in tank 20 with the distillate or condensed aromatic fraction which had flowed out of condenser 9 into tank 10. The mixture or spray liquor which was thus obtained in tank 20 had 36 percent by weight of water-soluble tea solids.

The spray liquor was flowed out of tank 20 through pipe 21a into cooler 22 where said spray liquor was cooled to 14° C.–16° C. (58° F.–60° F.) and the cooled spray liquor was carbonated at said temperature of 14° C.–16° in the carbonator 23, at an absolute pressure of 6.8–16.8 atmospheres (about 150–250 pounds per square inch), depending upon the quantity of carbon dioxide which was required to obtain a final spray-dried powder having a bulk density of 0.08 gram–0.09 gram per milliliter.

The spray-drying was done as in Example No. 2, and produced an excellent powder having an average bulk density of 0.085 gram per milliliter, and freely and easily soluble in cold water at less than 10° C. (50° F.).

The invention is not limited to countercurrent extraction because a single percolator may be used in each extraction stage. In general, the process produces an improved powdered tea extract which dissolves instantly and completely in distilled water or ordinary tap water at a temperature as low as 11° C.–13° C., and this solution can be chilled to 40 C. by adding ice, in order to make iced tea, without the formation of any precipitate. In general, and irrespective of counter-current extraction, the tea leaves are extracted in each extraction stage during a period of substantially 25 minutes to substantially 40 minutes by percolation, with water at a temperature of substantially 95° C.–105° C. (205° F.–220° F.). The weight of the water used in each extraction stage is substantially 12–16 times the weight of the charge of dry, unexhausted tea leaves. The aqueous extract may have at least substantially 2% by weight of tea solids.

The resulting extract is flowed through a stripping column 7 in which at least a part of the volatile aromatic substances are stripped from the initial aqueous tea extract. A major part and substantially all of the tea aromatics may be stripped. The distillate which is separated in the stripping column 7 is condensed in condenser 9, either with or without prior rectification in the rectifying column 8.

The dearomatized extract which flows out of stripping column 7 through pipe 7a is concentrated by evaporation to a selected solids content such as 8 percent of tea solids by weight. This concentrated extract is cooled in cooler 14 to a selected temperature below 11° C. (52° F.) but not too far below 11° C., so that substantially 28% to 34% by weight of the tea solids in the extract which flows into cooler 14 will be precipitated in said cooler 14 in the first run. This cooling temperature is maintained in centrifuge 15. During the first run, said 28 percent to 34 percent by weight of the precipitated tea solids will be flowed out of centrifuge 15 into the solubilizing tank 16, while the non-precipitated part of the extract which flows through cooler 14 and centrifuge 15 is flowed through pipe 15a into tank 17 during the first run.

The non-precipitated fraction which flows into tank 17 during the first run will therefore have (by weight) 64 percent to 72 percent of the tea solids in the dearomatized extract which flows through cooler 14 during the first run. The precipitated fraction which flows into solubilizing tank 17 during the first run is solubilized to be soluble in water at 13° C., to a maximum extent of 90 percent by weight. This can be done by using sodium sulfite or other solubilizing agent and heating the mixture.

The mixed fractions which are collected in tank 17 during the first and second runs are concentrated and mixed with the aromatic distillate in tank 20. The mixture which is formed in tank 20 therefore is free from cold-water-insoluble tea solids. The mixture which is formed in tank 20 is carbonated at substantially 7° C.–18° C. (45° F.–65° F.), under an absolute pressure of substantially 6–20 atmospheres, substantially without any foam formation by the addition of the carbon dioxide. The carbonated concentrate is spray-dried to provide a final powder whose bulk density is substantially 0.06 to 0.14 gram per milliliter.

The solubilized fraction which is formed in tank 16, and the residual fraction which flows through centrifuge 15 through pipe 15a, in the first run, may be concentrated together or may be concentrated separately and then mixed. Preferably, the solubilized fractions which are formed during the first and second runs are first mixed, as in tank 17, and then concentrated.

As another improvement tannic acid may be added to the concentrated, dearomatized extract which flows through cooler 14 during the first run, anterior said cooler and hence before chilling. The amount of tannic acid which is thus added is substantially 3 percent to 8 percent by weight of the tea solids of the concentrated, dearomatized extract which flows into tank 13.

As a further improvement, the separated solid or precipitated fraction which is collected in tank 16 during the first run, is solubilized to a degree of 55 percent to 75 percent by weight.

This invention includes not only the complete process disclosed herein but also includes the sub-combinations and steps of said process.

While illustrative examples have been stated, it is understood that numerous changes, omissions and substitutions can be made in the disclosure herein without departing from the scope of our invention.

We claim:

1. In the art of making a powdered tea extract, the steps in the art which consists in cooling an aqueous tea extract which has at least substantially 2% by weight of dissolved tea solids and which is substantially free from volatile tea aromatics, to a chilling temperature of substantially 8° C.–11° C., precipitating a selected ratio of the tea solids from said aqueous extract by said chilling and separating the precipitated part of the tea solids from said chilled aqueous tea extract, subjecting the separated precipitated part of the tea solids to a solubilizing treatment, in said treatment solubilizing to be cold-water-soluble at 11° C., up to a maximum of 90% by weight of said precipitated, separating the cold-water-solubilized fraction from the fraction which is not cold-water-solubilized, and mixing said cold-water-solubilized fraction with the non-precipitated part of said aqueous tea extract.

2. A method of producing an improved powdered tea extract which is easily and completely soluble in water at substantially 13° C. to form an aqueous solution which is substantially free from precipitated tea solids, said aqueous solution remaining stable and substantially free from precipitated tea solids at 4° C., which consists in extracting tea leaves with extracting water to form an initial aqueous tea extract, said tea leaves including a mass of substantially unexhausted tea leaves, said extracting water having a temperature of substantially 95° C.–105° C., the period of extraction being substantially 25–40 minutes, the weight of said extracting water being substantially 12–16 times the weight of said mass of substantially unexhausted tea leaves; stripping at least 50 percent by weight of the total volatile aromatics of said initial tea extract by means of steam; condensing said volatile aromatics separately from the stripped residue of said initial aqueous tea extract; concentrating said stripped residue by evaporating water therefrom to produce a concentrated stripped residue from which substantially 28%–34% by weight of the tea solids in said concentrated stripped residue are precipitatable by chilling said concentrated stripped residue to below and substantially close to 11° C.; chilling said concentrated stripped residue to precipitate substantially 28%–34% by weight of its tea solids in said concentrated stripped residue; separating said precipitated solids from the non-precipitated part of said chilled, concentrated, stripped residue; subjecting all of the precipitated tea solids to a cold-water-solubilizing treatment wherein up to a maximum of 90% by weight of the separated precipitated tea solids are solubilized, separating the cold-water-solubilized fraction from the fraction which is not cold-water-solubilized; concentrating the cold-water-solubilized fraction; concentrating said non-precipitated part of said concentrated stripped residue and mixing it with the concentrate of said cold-water-solubilized fraction, and mixing the last-mentioned mixture with the condensed volatile aromatics to form a spray liquid; carbonating said spray liquid with carbon dioxide at substantially 7° C.–18° C. under a carbonating pressure of substantially 6–20 atmospheres while substantially preventing the formation of any foam; and spray-drying the carbonated spray liquid to provide a powdered tea extract whose bulk density is substantially 0.06–0.14 gram per milliliter.

3. A method according to claim 1 in which said cold-water-solubilized fraction and said non-precipitated part are concentrated separately and then mixed.

4. A method according to claim 1 in which said cold-water-solubilized fraction and said non-precipitated part are mixed prior to concentration.

5. A method according to claim 1 in which tannic acid is added to said concentrated stripped residue prior to chilling it, the weight of the added tannic acid being substantially 3% to 8% of the weight of the tea solids in said concentrated stripped residue.

6. A method according to claim 1 in which the weight of said cold-water-solubilized fraction is substantially 55%–75% of the weight of said separated, precipitated tea solids.

7. A method according to claim 1, in which the tea leaves are extracted in countercurrent extraction in which the extracting water is flowed in series through a number of charges of tea leaves of gradually decreasing exhaustion, the last charge of said tea leaves being said mass of substantially unexhausted tea leaves.

8. A method according to claim 2 in which said initial tea extract has substantially 2% by weight of dissolved tea solids, said stripped residue being concentrated to produce a concentrated, stripped residue which has substantially 8% by weight of tea solids, said cold-water-solubilized fraction being concentrated to substantially three-tenths of its original volume, said non-precipitated part being concentrated to substantially three-tenths of its original volume.

9. A method of producing an improved powdered tea extract which is easily and completely soluble in water at substantially 13° C. to form an aqueous solution which is substantially free from precipitated tea solids, said aqueous solution remaining stable and substantially free from precipitated tea solids at 4° C., which consists in extracting tea leaves with extracting water to form an initial aqueous tea extract, stripping at least 50 percent by weight of the total volatile aromatics of said initial tea extract, condensing said volatile aromatics, concentrating said stripped residue by evaporating water therefrom to produce a concentrated stripping residue from which substantially 28%–34% by weight of the tea solids in said concentrated stripped residue are precipitatable by chilling said concentrated stripped residue to below and substantially close to 11° C.; chilling said concentrated stripped residue to precipitate substantially 28%–34% by weight of its tea solids in said concentrated stripped residue, separating said precipitated solids from the non-precipitated part of said chilled, concentrated, stripped residue, subjecting all of the precipitated tea solids to a cold-water-solubilizing treatment wherein up to a maximum of 90% by weight of said separated precipitated tea solids are solubilized, separating the cold-water-solubilized fraction from the fraction which is not cold-water-solubilized, concentrating said cold-water-solubilized fraction, concentrating said non-precipitated part of said concentrated stripped residue and mixing it with the concentrate of cold-water-solubilized fraction, and mixing the last-mentioned mixture with the condensed volatile aromatics to form a spray liquid, and spray-drying the spray liquid to provide a powdered tea extract.

References Cited in the file of this patent

UNITED STATES PATENTS

| | | |
|---|---|---|
| 2,788,276 | Reich et al. | Apr. 9, 1957 |
| 2,831,772 | Herz | Apr. 22, 1958 |
| 2,891,865 | Seltzer et al. | June 23, 1959 |
| 2,891,866 | Schroeder | June 23, 1959 |
| 2,912,334 | Wetherilt | Nov. 10, 1959 |
| 2,927,960 | Seltzer et al. | Mar. 8, 1960 |